United States Patent
Schindzielorz

(10) Patent No.: US 7,468,334 B2
(45) Date of Patent: Dec. 23, 2008

(54) SILICONE VULCANIZATE COATED FABRIC

(75) Inventor: Michael Schindzielorz, Kernersville, NC (US)

(73) Assignee: Highland Industries, Inc., Kernersville, NC (US)

( * ) Notice: Subject to any disclaimer, the term of this patent is extended or adjusted under 35 U.S.C. 154(b) by 18 days.

(21) Appl. No.: 10/956,333

(22) Filed: Oct. 4, 2004

(65) Prior Publication Data

US 2006/0073750 A1    Apr. 6, 2006

(51) Int. Cl.
*B32B 27/02* (2006.01)

(52) U.S. Cl. ............... 442/164; 442/59; 442/62; 442/76; 442/148; 442/168

(58) Field of Classification Search ............... 442/59, 442/62, 76, 148, 164, 168, 170
See application file for complete search history.

(56) References Cited

U.S. PATENT DOCUMENTS

| | | | |
|---|---|---|---|
| 3,294,709 A | 12/1966 | Nitzsche et al. | |
| 3,639,583 A * | 2/1972 | Cardarelli et al. | 424/125 |
| 3,723,566 A | 3/1973 | Thompson et al. | |
| 4,130,535 A * | 12/1978 | Coran et al. | 524/487 |
| 4,265,801 A | 5/1981 | Moody et al. | |
| 4,465,552 A | 8/1984 | Bobbio et al. | |
| 4,500,688 A | 2/1985 | Arkles | |
| 4,525,531 A | 6/1985 | Zukosky et al. | |
| 4,594,390 A * | 6/1986 | Abdou-Sabet et al. | 525/232 |
| 4,668,754 A | 5/1987 | Policastro et al. | |
| 4,695,602 A | 9/1987 | Crosby et al. | |
| 4,877,855 A | 10/1989 | Nagaoka et al. | |
| 4,959,404 A | 9/1990 | Nakane et al. | |
| 5,004,793 A | 4/1991 | Nagaoka et al. | |
| 5,258,211 A | 11/1993 | Momii et al. | |
| 5,317,046 A | 5/1994 | Fonkalsrud | |
| 5,328,966 A | 7/1994 | Nagaoka | |
| 5,364,700 A | 11/1994 | Domeier | |
| 5,597,867 A | 1/1997 | Tsujimoto et al. | |
| 5,705,445 A | 1/1998 | Chikaraishi et al. | |
| 5,708,084 A | 1/1998 | Hauenstein et al. | |
| 5,789,084 A | 8/1998 | Nakamura et al. | |
| 5,877,256 A | 3/1999 | Nakamura et al. | |
| 5,928,721 A | 7/1999 | Parker et al. | |
| 5,945,186 A * | 8/1999 | Li et al. | 428/36.1 |
| 6,013,715 A * | 1/2000 | Gornowicz et al. | 524/492 |
| 6,127,010 A * | 10/2000 | Rudy | 428/35.7 |
| 6,140,414 A | 10/2000 | Ohsawa et al. | |
| 6,147,160 A * | 11/2000 | Wang et al. | 525/106 |
| 6,153,691 A * | 11/2000 | Gornowicz et al. | 524/861 |
| 6,200,915 B1 | 3/2001 | Adams et al. | |
| 6,258,914 B1 | 7/2001 | Su et al. | |
| 6,268,300 B1 * | 7/2001 | Hernandez et al. | 442/168 |
| 6,354,620 B1 | 3/2002 | Budden et al. | |
| 6,362,287 B1 * | 3/2002 | Chorvath et al. | 525/431 |

(Continued)

FOREIGN PATENT DOCUMENTS

DE        10024935        11/2001

*Primary Examiner*—Arti Singh
(74) *Attorney, Agent, or Firm*—Foley & Lardner LLP

(57) ABSTRACT

An airbag fabric which has been coated with a polyamide coating, comprising a thermoplastic silicone vulcanizate. The coating may be adhered to the airbag fabric without the use of a primer and may be cured at room temperature. The coated airbag fabric may be reheated during fabrication and heat welded at the fabric boundary.

15 Claims, 1 Drawing Sheet

U.S. PATENT DOCUMENTS

| | | |
|---|---|---|
| 6,420,037 B1 | 7/2002 | Tsuji et al. |
| 6,425,600 B1 | 7/2002 | Fujiki et al. |
| 6,433,049 B1 * | 8/2002 | Romenesko et al. ........ 524/261 |
| 6,451,715 B2 * | 9/2002 | Li et al. ........................ 442/76 |
| 6,511,754 B1 | 1/2003 | Bohin et al. |
| 6,649,704 B2 * | 11/2003 | Brewer et al. ................ 525/431 |
| 6,713,569 B2 * | 3/2004 | Chorvath et al. ............ 525/431 |
| 2002/0091205 A1 | 7/2002 | Brewer et al. |
| 2003/0105260 A1 | 6/2003 | Cook et al. |
| 2003/0170469 A1 | 9/2003 | Ikuta et al. |
| 2006/0100347 A1 * | 5/2006 | Ouhadi et al. ............... 524/502 |

* cited by examiner

SILICONE VULCANIZATE COATED FABRIC

BACKGROUND OF THE INVENTION

The present invention relates to an airbag fabric which may be self-sealing, self-adhering, and heat welded.

Airbags are used as safety devices in vehicles. Many types of airbags require gas leakage to be minimized when the airbag is inflated. For example, side curtain type airbags are required to remain inflated to protect passengers of a vehicle in a "rollover" type accident. To reduce air permeability of the airbag so that inflation pressure can be sustained, conventional airbags are typically made from an airbag fabric having a coating. A typical airbag is made of a nylon cloth coated with a silicone rubber because the silicone rubber displays good heat resistance and weather resistance properties. Applying the coating to the airbag fabric, however, increases the complexity and duration of the manufacturing process.

Another drawback of conventional silicone rubber coating compositions is that such compositions poorly adhere to a base cloth, such as nylon. To improve adherence, conventional coating compositions typically require a primer, which is applied to the base cloth in advance of the coating. Primers have various disadvantages. For example, application of a primer increases the complexity and duration of the manufacturing process. Additionally, the use of a primer requires the use of organic solvents, which are toxic and may create an aggravated or dangerous working environment. Although attempts have been made to eliminate the need for primers by making silicone rubber coatings self-adhesive, conventional methods have not provided the silicone rubber coating with a sufficient amount of adhesion.

Conventional coating compositions further complicate the manufacturing process because such coatings require a complex curing procedure. The curing procedure typically involves heating the coating to a high temperature to melt the coating, applying the melted coating to a fabric, and allowing the coating to cool, as explained, for example, in U.S. Pat. No. 6,200,915 (incorporated by reference herein). Conventional coating compositions may be formed as a powder. Curing of powder coatings requires heating the powder to a melting point to coat the fabric, as explained, for example, in U.S. Pat. No. 5,928,721 (incorporated by reference herein).

SUMMARY OF THE INVENTION

According to one aspect of the present invention, an airbag fabric includes a matrix of nylon yarns and a coating that includes a thermoplastic silicone vulcanizate.

According to another aspect of the present invention, a method of coating an airbag includes the steps of applying a thermoplastic silicone vulcanizate coating to a nylon airbag fabric without the use of a primer and curing the coating at room temperature.

According to another aspect of the present invention, an airbag includes an airbag fabric and a thermoplastic silicone vulcanizate coating. The thermoplastic silicone vulcanizate coating coats or covers the airbag fabric It is to be understood that both the foregoing general description and the following detailed description are exemplary and explanatory only, and are not restrictive of the invention as claimed.

DETAILED DESCRIPTION

Figure 1:
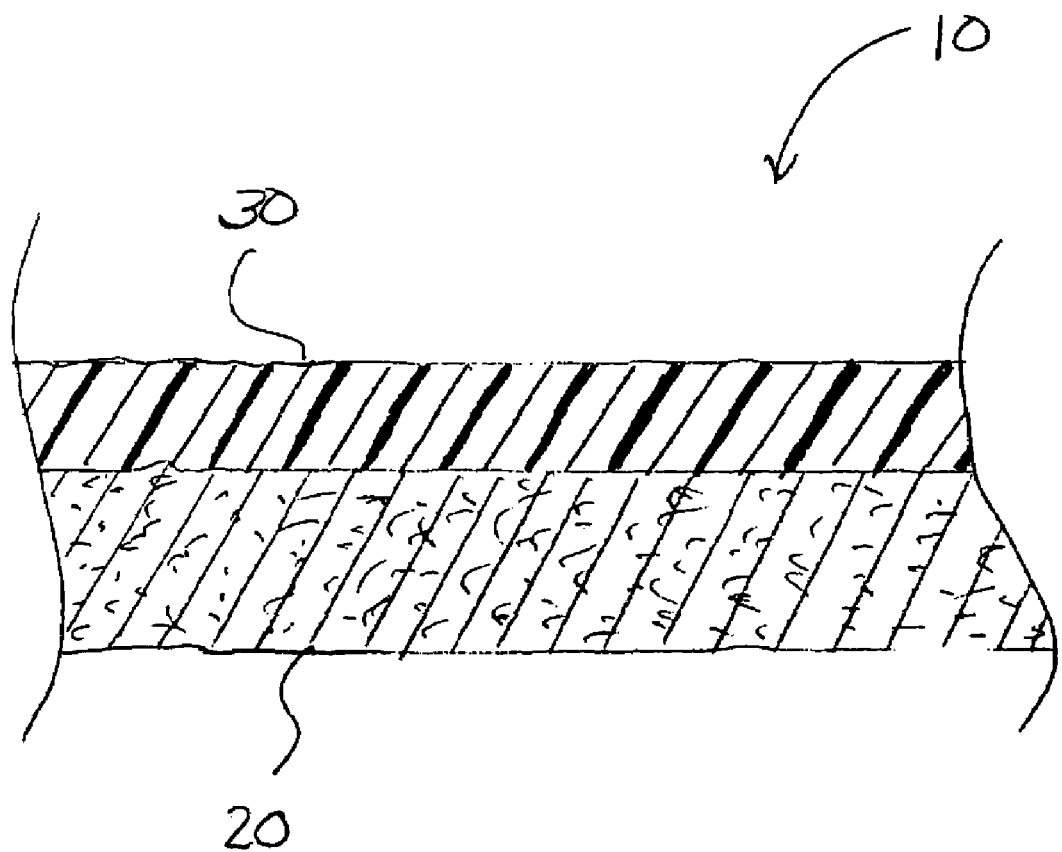
FIG. 1 is a cross sectional view of an airbag fabric according to an embodiment of the present invention.

According to an embodiment of the present invention, an airbag fabric 10 includes a base fabric 20 and a coating composition 30 configured to adhere to the base fabric 20 to seal the base fabric 20, as shown in FIG. 1. The coating composition 30 comprises a thermoplastic silicone vulcanizate. The coating composition 30 includes silicone particles or powder dispersed in a thermoplastic binder, such as, for example, polyamide, nylon, or polypropylene. The coating composition 30 is preferably a thermoplastic silicone vulcanizate manufactured by Dow Corning Company under the brand name TPSiV™. However, any other similar thermoplastic silicone vulcanizate may be used. Use of a thermoplastic silicone vulcanizate as the coating material enables a greater degree of coating penetration into the base fabric 20 because a lower coating viscosity is achieved for the same relative process temperature as a conventional coating composition. Additionally, the presence of silicone in the coating composition 30 improves the high temperature resistance of the coated airbag fabric 10.

The coating may be applied to the base fabric 20 under normal conditions. The base fabric 20 should be sufficiently clean to prevent the adhesion of foreign particles to the base fabric 20. The coating composition 30 may be applied to the base fabric 20 in one or more layers. Preferably, however, only one layer of the coating composition 30 is applied to the base fabric 20. The coating composition 30 may be applied to both sides of the base fabric 20 or only to one side of the base fabric 20. According to an exemplary embodiment, the base fabric 20 is preheated prior to application of the coating composition 30 to improve adherence of the coating composition 30 to the fabric.

According to an embodiment, the coating composition 30 may be applied directly to the base fabric 20 without first applying a primer. Use of a primer may be eliminated because the coating composition 30 is self-adhesive and therefore adheres to the base fabric 20. Alternatively, the coating composition 30 may be used in combination with a primer.

According to an embodiment, the coating composition 30 may be applied to the base fabric 20 and cured without heating and/or cooling. In other words, the coating composition 30 may be applied to the base fabric 20 at room temperature. For example, a temperature of a coating knife and a temperature of a coating curtain may be approximately room temperature. After application of the coating to the fabric, the coating composition 30 will solidify (i.e., cure) at room temperature. The exact temperature of solidification, however, will depend on the specific coating composition 30 (i.e., the specific thermoplastic silicon vulcanizate). Thus, the coating composition 30 can be applied to the fabric and cured at approximately room temperature.

The base fabric 20 may be any fabric that is suitable for use as an airbag fabric. In an exemplary embodiment, the base fabric 20 is a polyamide fabric, such as nylon. The base fabric 20 may be a matrix of nylon yarns configured to create a durable, low-weight, and flexible fabric. Preferably, both the base fabric 20 and the coating composition 30 comprise polyamides so that the coating composition 30 will adhere to the base fabric 20 and exhibit stronger adhesion properties than a non-polyamide coating composition 30 and a polyamide fabric or a polyamide coating composition 30 and a non-polyamide fabric.

The coated airbag fabric 10 may be used for any type of airbag but is particularly suited for use in side curtain type airbags. Side curtain type airbags must maintain inflation pressure for an extended duration to prevent or minimize injury during a side impact or vehicle roll-over. Because the coating composition 30 is self-adhesive to the base fabric 20, the coating composition 30 is self-sealing so that air permeability of the base fabric 20 is reduced. Therefore, a side curtain type airbag made of the coated airbag fabric has an improved ability to maintain inflation pressure because air leakage is reduced.

The coating composition 30 may be applied to the base fabric 20 by various methods. For example, the coating composition 30 may be applied by an extrusion coating process. An extrusion coating process allows the coating composition 30 to be applied to the base fabric 20 and formed into a preferred form by pressing the fabric and coating composition 30 through a die. The extrusion coating process quickens production time and minimizes the process of coating a base fabric 20 to form the coated airbag fabric.

According to an embodiment, the extrusion coating process includes providing the coating composition 30 in pellet form. The coating composition 30 is heated and delivered to an orifice of a coating machine. As the base fabric 20 advances through the coating machine, the coating composition 30 is deposited onto the base fabric 20. Application of a nipping pressure to the base fabric 20 mates the coating composition 30 to the fabric. A chill drum may also be provided to reduce a temperature of the coating composition 30 after application of the coating composition 30 to the base fabric 20.

An airbag fabric 10 produced according to the embodiments described above has improved manufacturability. For example, use of a thermoplastic silicone vulcanizate coating composition 30 enables heat welding of the airbag fabric 10. Heat welding is made possible due to the melt reprocessability of the thermoplastic silicone vulcanizate, which can be reheated during fabrication without a corresponding loss of adhesive or sealing properties. An airbag can be formed, for example, by heat welding pieces of the airbag fabric 10 together at the fabric boundaries or edges. The thermoplastic silicone vulcanizate coating on one piece of fabric bonds with the thermoplastic silicone vulcanizate coating on the other piece of fabric to produce a well-sealed seam. The need for sewing fabric pieces together is eliminated, which reduces manufacturing process time. Moreover, because the seams of the airbag are not sewn, leakage of inflation gas from the airbag is reduced.

Thermoplastic silicone vulcanizates display a natural affinity for bonding with polyamides, such as nylon. Thus, when a base fabric 20 of an airbag fabric 10 comprises a nylon polyamide, the thermoplastic silicone vulcanizate adheres to the nylon fabric. The bonding affinity displayed between thermoplastic silicone vulcanizate and nylon allows the thermoplastic silicone vulcanizate to coat the base fabric 20 and adhere sufficiently well, with or without the use of a primer. In this manner, an airbag fabric 10 having improved manufacturability and reduced air permeability is provided.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag fabric comprising:
   a matrix of nylon yarns; and
   a coating comprising a thermoplastic silicone vulcanizate,
      wherein the thermoplastic silicone vulcanizate comprises silicone particles or powder dispersed in a thermoplastic binder.

2. The airbag fabric of claim 1, wherein the coating is cured at room temperature when adhered to the matrix of nylon yarns.

3. The airbag fabric of claim 1, wherein the nylon yarns coated with the coating may be reheated during fabrication; and
   wherein the airbag fabric may be heat welded at a fabric boundary.

4. The airbag fabric of claim 1, wherein the coating is self-sealing on the matrix of nylon yarns.

5. The airbag fabric of claim 1, wherein the matrix of nylon yarns is coated with the coating by an extrusion coating process.

6. The airbag fabric of claim 1, wherein the thermoplastic silicone vulcanizate may directly adhere to the nylon yarns without the use of a primer.

7. The airbag fabric of claim 1, wherein the nylon yarns and the coating are both polyamides to increase adhesion of the coating to the nylon yarns.

8. The airbag fabric of claim 1, wherein the coating comprises a liquid silicone rubber.

9. A method of coating an airbag fabric comprising the steps of:
   applying a thermoplastic silicone vulcanizate coating directly onto a nylon airbag fabric, wherein the thermoplastic silicone vulcanizate coating comprises silicone particles or powder dispersed in a thermoplastic binder; and
   curing the coating at room temperature.

10. The method of claim 9, wherein the step of applying the coating does not include a use of a primer.

11. An airbag comprising:
    an airbag fabric; and
    a thermoplastic silicone vulcanizate coating covering the airbag fabrics,
       wherein the thermoplastic silicone vulcanizate coating comprises silicone particles or powder dispersed in a thermoplastic binder.

12. The airbag according to claim 11, wherein the airbag is configured to deploy along a side of a vehicle to protect an occupant of the vehicle during a vehicle rollover condition.

13. The airbag fabric of claim 1, wherein the thermoplastic binder is polyamide, nylon, or polypropylene.

14. The method of claim 9, wherein the thermoplastic binder is polyamide, nylon, or polypropylene.

15. The airbag according to claim 11, wherein the thermoplastic binder is polyamide, nylon, or polypropylene.

* * * * *